United States Patent
Burns et al.

(10) Patent No.: US 8,709,244 B2
(45) Date of Patent: Apr. 29, 2014

(54) MOBILE SYSTEM AND METHOD FOR GENERATING AND DISPENSING A CHEMICAL

(75) Inventors: Ivey Burns, Kissimmee, FL (US); Greg Waldron, Kissimmee, FL (US); David A. Killian, Orlando, FL (US)

(73) Assignee: Disney Enterprises, Inc., Burbank, CA (US)

( * ) Notice: Subject to any disclaimer, the term of this patent is extended or adjusted under 35 U.S.C. 154(b) by 17 days.

(21) Appl. No.: 12/558,828

(22) Filed: Sep. 14, 2009

(65) Prior Publication Data
US 2011/0062086 A1 Mar. 17, 2011

(51) Int. Cl.
*C02F 1/76* (2006.01)
*C02F 103/42* (2006.01)

(52) U.S. Cl.
USPC .................. 210/167.11; 210/198.1; 210/241

(58) Field of Classification Search
USPC .............. 210/105, 167.11, 167.3, 753, 241, 210/198.1; 424/661; 68/12.01
See application file for complete search history.

(56) References Cited

U.S. PATENT DOCUMENTS

| 5,197,636 | A | | 3/1993 | Mitchell et al. | |
|---|---|---|---|---|---|
| 5,366,605 | A | * | 11/1994 | Wang | 210/96.2 |
| 5,453,207 | A | * | 9/1995 | Simpson et al. | 210/739 |
| 7,553,407 | B2 | * | 6/2009 | Lack | 210/103 |
| 2005/0016933 | A1 | * | 1/2005 | Perlich et al. | 210/754 |
| 2005/0023224 | A1 | * | 2/2005 | Schmitz et al. | 210/739 |
| 2006/0018940 | A1 | * | 1/2006 | DiPietro et al. | 424/405 |
| 2007/0158274 | A1 | * | 7/2007 | King | 210/739 |

FOREIGN PATENT DOCUMENTS

| EP | 1357088 A1 | 10/2003 | |
|---|---|---|---|
| WO | WO-02/053280 A1 * | 7/2002 | ............... B01J 19/08 |
| WO | 2006091618 A2 | 8/2006 | |
| WO | 2009091854 A1 | 7/2009 | |

* cited by examiner

*Primary Examiner* — Nam Nguyen
*Assistant Examiner* — Paul J Durand
(74) *Attorney, Agent, or Firm* — Ference & Associates LLC

(57) ABSTRACT

A mobile system for generating and dispensing a chemical includes a portable platform comprising a source of a gaseous chemical, the gaseous chemical forming a solution in water, and a fluid coupling through which the gaseous chemical is delivered to a body of water.

7 Claims, 4 Drawing Sheets

MOBILE SYSTEM AND METHOD FOR GENERATING AND DISPENSING A CHEMICAL

BACKGROUND

The generation and delivery of one or more chemicals is part of the on-going operation and maintenance of a swimming pool. Chlorine is one of the most important chemicals used for maintaining a swimming pool in a safe and healthy condition. Chlorine neutralizes many harmful pathogens and retards the growth of algae. Typically, in a non-commercial environment, chlorine is dispensed into the swimming pool manually, either by direct application in liquid or powder format, or in a time-delayed manner, such as in tablet form applied in, for example, a floating dispenser. However, the manual dispensing of chlorine is typically not permitted and/or not practical in a commercial or municipal swimming pool.

Existing technology for treating and disinfecting swimming pools has been standardized to use chlorine as the primary disinfectant. While the treatment efficacy of chlorine has been called into question recently with chlorine-resistant pathogens, the industry is entrenched in this technology and is not generally agreeable to investigating alternative sanitation methodologies, such as ozone, chlorine-dioxide ($CLO_2$) and ultraviolet (UV) sterilization.

Some of the more dangerous pathogens that can inadvertently be released into and persist in a swimming pool are cryptosporidium, Giardia, or other chorine-resistant pathogens.

With particular regard to cryptosporidium, owing to its structure, cryptosporidium displays a resistance to typical chlorination methods, which render these typical chlorination methods largely ineffective at neutralizing these pathogens at any but extremely high dosages. It has been realized that chlorine dioxide ($ClO_2$) is particularly effective to neutralize and combat the growth of cryptosporidium, and other chlorine-resistant pathogens in a swimming pool.

However, because chlorine dioxide exists only as an unstable gas it must be generated onsite and used immediately. Unfortunately, while methods to generate chlorine dioxide are available, the safe and consistent application of chlorine dioxide into a swimming pool remains difficult.

SUMMARY

Embodiments of the invention include a mobile system for generating and dispensing a chemical. The mobile system includes a portable platform, the portable platform comprising a source of a gaseous chemical, the gaseous chemical forming a solution in water, and a fluid coupling through which the gaseous chemical is delivered to a body of water.

Other embodiments are also provided. Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

The invention can be better understood with reference to the following figures. The components within the figures are not necessarily to scale, emphasis instead being placed upon clearly illustrating the principles of the invention. Moreover, in the figures, like reference numerals designate corresponding parts throughout the different views.

DETAILED DESCRIPTION

The mobile system and method for generating and dispensing a chemical will be described primarily in the context of generating and dispensing chlorine dioxide ($ClO_2$) for a commercial swimming pool. However, the mobile system and method for generating and dispensing a chemical can be used to generate and dispense any chemical to any body of water, where it is desired that the generating and dispensing system be portable. In the description to follow, the term "pool" refers to any commercial or private swimming pool, or any body of water sought to be treated.

Figure 1:
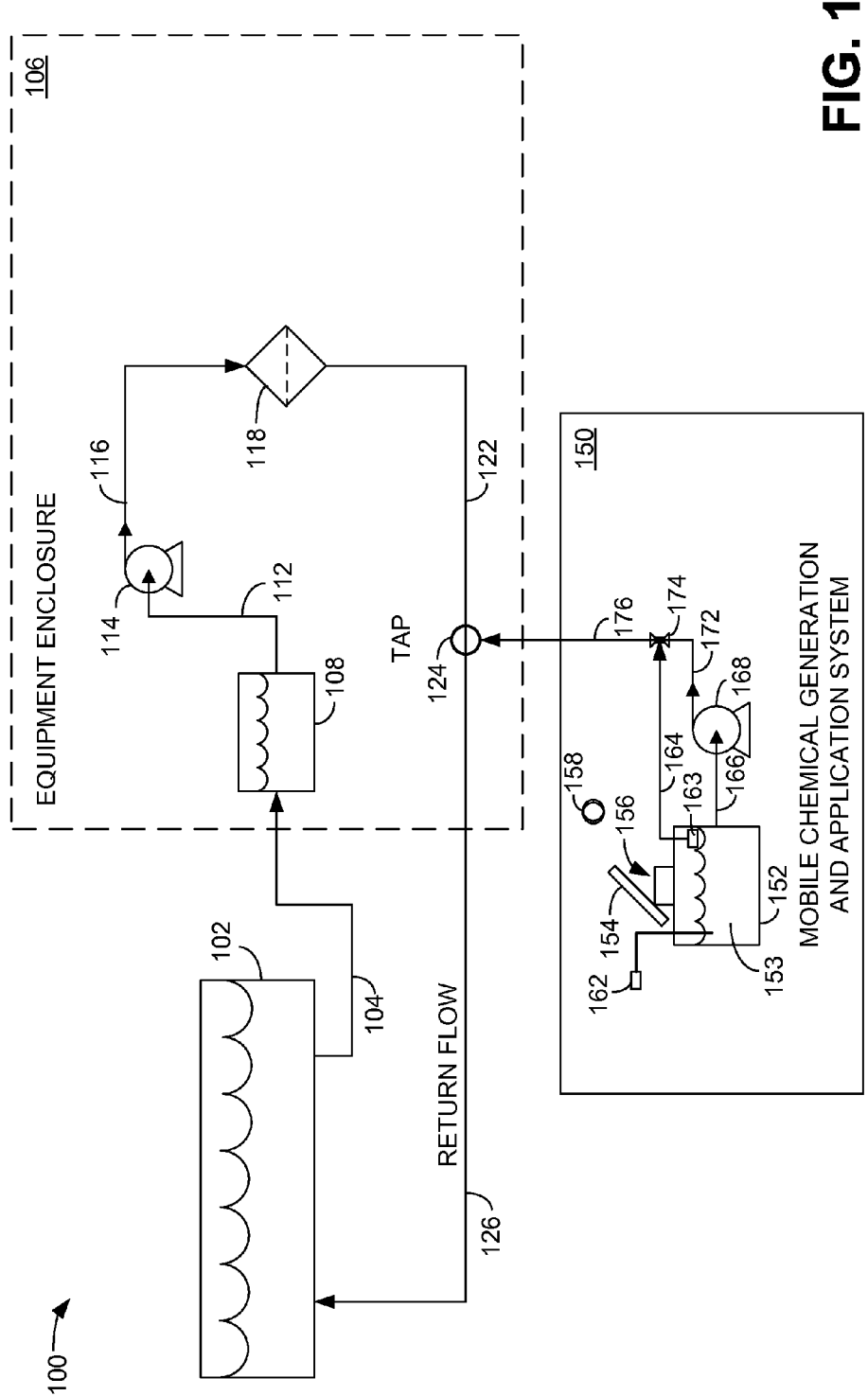
FIG. 1 is a block diagram illustrating an embodiment of a mobile system for generating and dispensing a chemical.

FIG. 1 is a block diagram illustrating an embodiment of the system for generating and dispensing a chemical. The system 100 includes a body of water 102. For purposes of example only, the body of water 102 can be a private or, in this example, a commercial swimming pool. In accordance with the normal operation of a swimming pool, a supply flow of water is provided through a fluid conduit 104 into a collection tank 108. The collection tank 108 is part of a conventional filtration system and is typically located in an equipment enclosure 106 in the vicinity of the body of water 102. Water from the collection tank 108 is provided through fluid conduit 112 to a filter pump 114. The filter pump 114 pumps the water through fluid conduit 116 into a filter element 118. As known in the art, the filter element 118 can comprise a replaceable media such as, for example, sand, diatomaceous earth, charcoal, or any other filter media. The output of the filter element 118 is provided over fluid conduit 122 to a tap 124. The tap 124 can be any fluid coupling that allows fluid access to the fluid connection 122 and the fluid connection 126. The fluid connection 126 comprises the return flow of filtered water to the swimming pool 102.

As will be described below, the tap 124 also allows the introduction of an additional flow of fluid from fluid connection 176 to mix with the flow of water from fluid connection 122 toward fluid connection 126.

In accordance with an embodiment of the system for generating and dispensing a chemical, a mobile chemical generation and application system 150 can reside on a portable platform, such as a mobile truck or trailer. The portable platform on which the mobile chemical generation and application system 150 resides can be any that allows it to be easily transported from one location to another location and that allows chlorine dioxide, or another chemical or chemicals, to be locally-generated, that is, generated in the vicinity of the body of water to be treated, and to be delivered to the body of water as needed. In a preferred embodiment, the portable platform containing the mobile chemical generation and application system 150 is transported from one swimming pool to another swimming pool as needed. The tap 124 remains fixed on the fluid connection 126 whereby a quick disconnect fluid coupling can be used to releasably couple the fluid connection 176 to the tap 124.

In the embodiment shown in FIG. 1, the mobile chemical generation and application system 150 includes a water tank 152, a pump 168, and a venturi 174. In accordance with this embodiment, chlorine dioxide is generated by using one or more chlorine dioxide generator tablets 158 that are introduced into the tank 152 through an opening 156. Once the tablets 158 are introduced into the tank 152, the hatch 154 is closed, sealing the water tank 152, and the tablets 158 mix with water 153, thereby generating $CLO_2$, which goes into solution in the water 153. The water 153 now includes a gaseous solution of chlorine dioxide, which is provided through fluid conduit 166 to the pump 168. The pump 168 pumps the chlorine dioxide rich water through fluid connection 172. While the generation of chlorine dioxide is described herein, the mobile chemical generation and application system 150 can be used to generate and deliver other chemicals.

A vapor capture apparatus 163 captures any gaseous chlorine dioxide that might reside above the water 153 and transfers the gaseous chlorine dioxide via connection 164 to a venturi 174, where the gaseous chlorine dioxide in connection 164 is combined with the chlorine dioxide rich water in fluid connection 172 and provided through fluid conduit 176 for introduction to the filter return water via the tap 124. The vapor capture apparatus 163 prevents the accumulation of gaseous chlorine dioxide above the water 153 in the water tank 152. This is to prevent the concentration of gaseous chlorine dioxide from approaching explosive levels. For example, the concentration of gaseous chlorine dioxide may approach explosive levels if allowed to exceed a concentration of approximately 10% in air.

In this manner, water rich in chlorine dioxide is safely and efficiently provided to the swimming pool 102. In an embodiment, the desired concentration of chlorine dioxide in the body of water 102 can be 2.5 to 3.5 parts per million (ppm); however, other concentration levels are possible. As known in the art, the venturi 174 is capable of approximately 95% mixing efficiency when combining the captured gaseous chlorine dioxide in connection 164 and mixing it with the aqueous flow in connection 172.

The tank 152 also includes a vent and filter apparatus 162 so that trace amounts of chlorine dioxide not captured by the vapor capture apparatus 163 can be vented and safely filtered before being introduced to the atmosphere. In an embodiment, the vent and filter apparatus 162 can comprise an activated carbon filter.

In this embodiment, the amount of chlorine dioxide generated (the tablet dosage) is computed ahead of time and a predetermined number of tablets 158 are added to the water tank 152 based on the amount of water that is being treated and the size and concentration of each tablet 158. This mixture results in a relatively high concentration of dissolved chlorine dioxide which is directly injected into the water return flow path via the tap 124 and the fluid conduit 126. In accordance with this embodiment, the mobile chemical generation and application system 150 can easily and conveniently be transported from body of water to body of water as needed. Further, the single point of injection (through the tap 124), which remains in place on the fluid conduits 122 and 126 allows a convenient and easy way of introducing chlorine dioxide into the body of water 102 using the in-place distribution system (i.e., the tap 124) via nozzles that are included as part of the tap 124 to assure good distribution of the chemical-rich water in fluid conduit 176 into the return flow in fluid connection 126.

Figure 2:
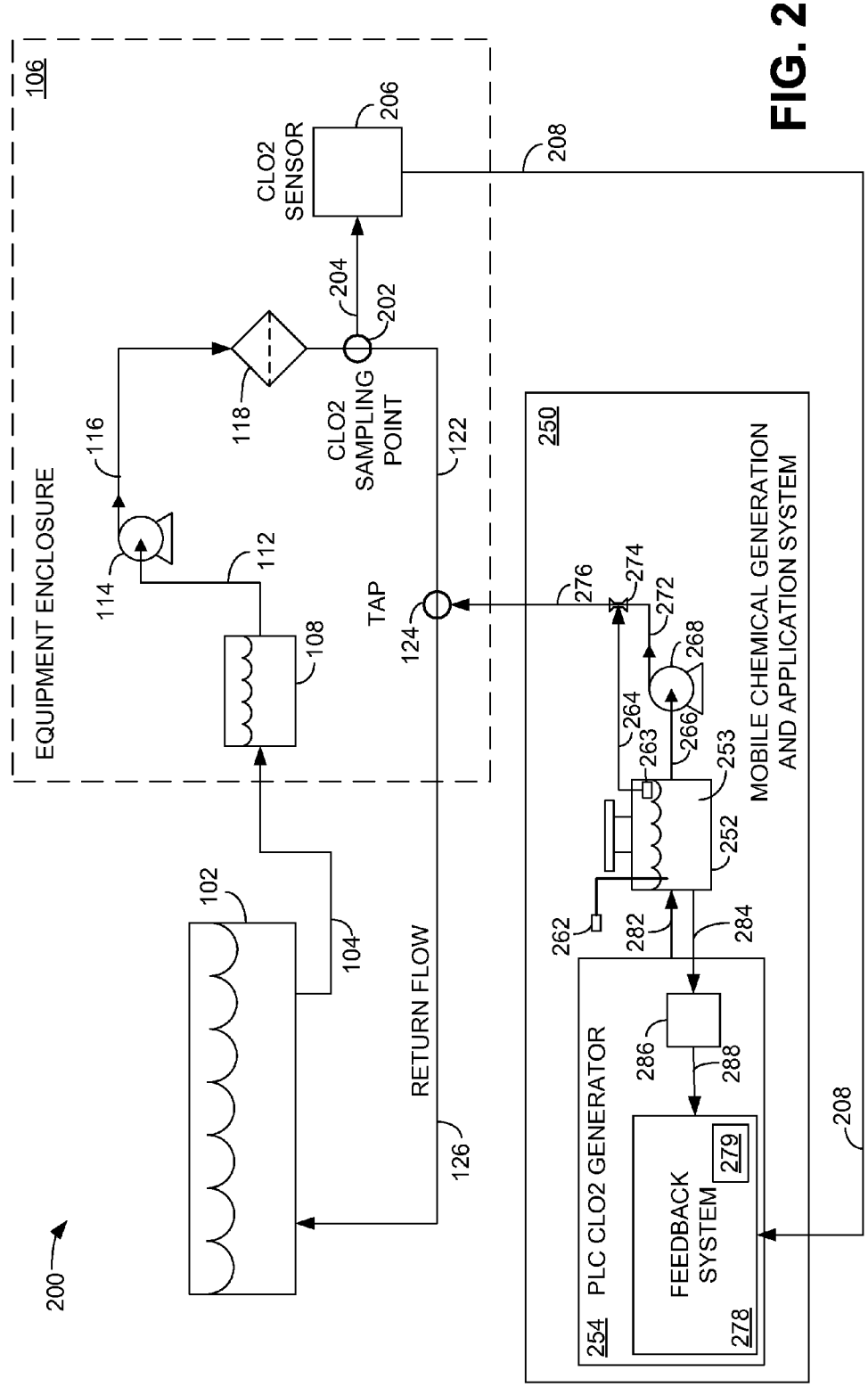
FIG. 2 is a block diagram illustrating an alternative embodiment of a mobile system for generating and dispensing a chemical.

FIG. 2 is a block diagram illustrating an alternative embodiment of a mobile system for generating and dispensing a chemical. The elements in FIG. 2 that are similar to the elements in FIG. 1 will be referred to using the convention 2XX, where "XX" in FIG. 2 refers to a corresponding element in FIG. 1.

In the embodiment shown in FIG. 2, a chlorine dioxide sampling point 202 is formed in the fluid conduit 122 downstream from the filter element 118 and upstream from the tap 124. The chlorine dioxide sampling point 202 can be a quick disconnect fitting similar to the tap 124, or can be any other temporary or permanent fluid conduit. The chlorine dioxide sampling point 202 directs a portion of the water in fluid conduit 122 and passes it through a fluid conduit 204 to a chlorine dioxide sensor 206. The chlorine dioxide sensor 206 determines the concentration of chlorine dioxide in the water in fluid conduit 204 and generates an electrical signal representative thereof. The output of the chlorine dioxide sensor 206 is provided over electrical connection 208.

In the embodiment shown in FIG. 2, the mobile chemical generation and application system 250 includes a programmable logic control (PLC) chlorine dioxide generator 254. The PLC chlorine dioxide generator 254 is coupled to the water tank 252 over fluid connection 282. The PLC chlorine dioxide generator 254 also includes, or can be associated with, a feedback system 278 and an additional chlorine dioxide sensor 286. In an embodiment, the feedback system 278 may include a timer 279. The timer 279 can be implemented in some embodiments to control the duration of the delivery of chlorine dioxide. The chlorine dioxide sensor 286 is coupled to the water tank 252 via fluid conduit 284. The chlorine dioxide sensor 286 determines the concentration of chlorine dioxide in the water in fluid conduit 284 from the water tank 252 and generates an electrical signal representative thereof on electrical connection 288. While shown as part of the PLC chlorine dioxide generator 254, the feedback system 278 and the chlorine dioxide sensor 286 can be separate elements.

The feedback system 278 receives information regarding the concentration of chlorine dioxide at the chlorine dioxide sampling point 202, representing actual concentration of chlorine dioxide in the body of water 102 and also receives information regarding the concentration of chlorine dioxide in the tank 252. The feedback system 278 can then control the amount of chlorine dioxide being generated by the PLC chlorine dioxide generator 254 based on a number of factors, such as such as desired concentration, and the ratio of the concentration of chlorine dioxide between the sampling point 202 and the water tank 252. In an embodiment, the feedback system 278 ensures that the concentration of chlorine dioxide in the water tank 252 does not exceed 3,000 parts per million (ppm), which represents the maximum safe aqueous concentration. The feedback system 278 employs an industry standard loop control algorithm, referred to as the Proportional, Integral Derivative (PID) loop control algorithm, which proactively matches chemical generation and supply to target set point without overshooting or undershooting the target levels. The concentration level of chlorine dioxide in the water tank 252 would typically be set according to the makeup water (not shown) available to replenish tank consumption as water-rich chlorine dioxide is fed into the system. If makeup water is available to match feed water, then a lower concentration of tank water may be preferred. Alternatively, if makeup water is limited or non existent then the concentration of tank water would be set at a high level to assure adequate $CLO_2$ feed while staying below the above-mentioned explosive levels.

A vapor capture apparatus 263 captures any gaseous chlorine dioxide that might reside above the water 253 and transfers the gaseous chlorine dioxide via connection 264 to a venturi 274, where the gaseous chlorine dioxide in connection 264 is combined with the chlorine dioxide rich water in fluid connection 272 and provided through fluid conduit 276 for introduction to the filter return water via the tap 124. The vapor capture apparatus 263 prevents the accumulation of gaseous chlorine dioxide above the water 253 in the water tank 252. This is to prevent the concentration of gaseous chlorine dioxide from approaching explosive levels. For example, the concentration of gaseous chlorine dioxide may approach explosive levels if allowed to exceed a concentration of approximately 10% in air.

In this manner, water rich in chlorine dioxide is provided to the swimming pool 102. In an embodiment, the desired concentration of chlorine dioxide in the body of water 102 can be 2.5 to 3.5 parts per million (ppm); however, other concentration levels are possible. As known in the art, the venturi 274 provides approximately 95% mixing efficiency when combining the captured gaseous chlorine dioxide in connection 264 and mixing it with the aqueous flow in connection 272.

The tank 252 also includes a vent and filter apparatus 262 so that trace amounts of chlorine dioxide not captured by the vapor capture apparatus 263 can be vented and safely filtered instead of being introduced to the atmosphere. In an embodiment, the vent and filter apparatus 262 can comprise an activated carbon filter.

The PLC chlorine dioxide generator 25 is a substantially more economical source of chlorine dioxide than using the tablets 158 (FIG. 1) described above. Further, by using the chlorine dioxide sensor 206 and feedback system 278, the target dose of chlorine dioxide can be easily reached and maintained.

Figure 3:
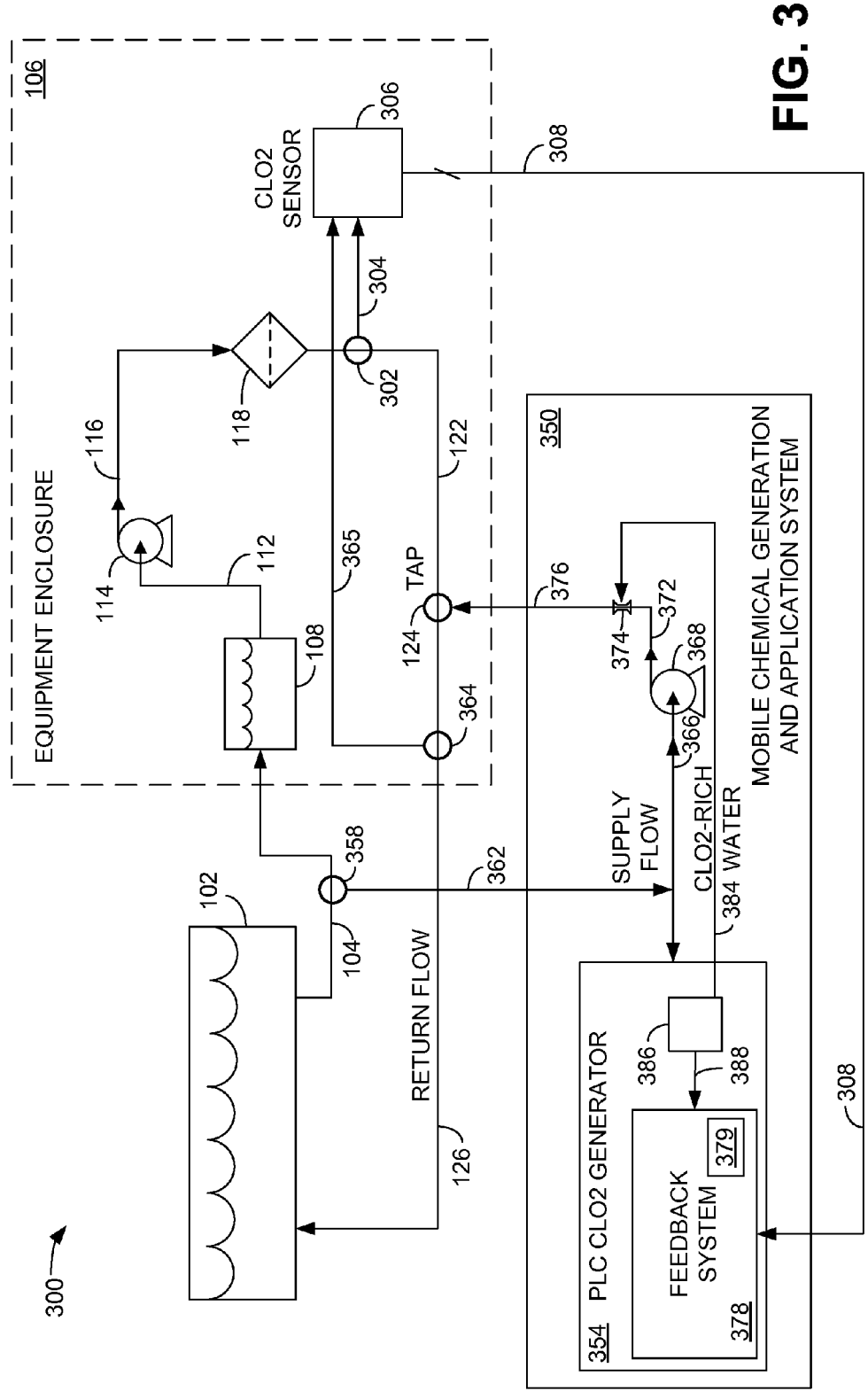
FIG. 3 is a block diagram illustrating an alternative embodiment of a mobile system for generating and dispensing a chemical.

FIG. 3 is a block diagram illustrating an alternative embodiment of a mobile system for generating and dispensing a chemical. The elements in FIG. 3 that are similar to the elements in FIG. 2 will be referred to using the convention 3XX, where "XX" in FIG. 3 refers to a corresponding element in FIG. 2.

In the embodiment shown in FIG. 3, a chlorine dioxide sampling point 302 is inserted in the fluid conduit 122 downstream from the filter element 118 and upstream from the tap 124. The chlorine dioxide sampling point 302 can be a quick disconnect fitting similar to the tap 124, or can be any fluid conduit. The chlorine dioxide sampling point 302 directs a portion of the water in fluid conduit 122 and passes it through a fluid conduit 304 to a chlorine dioxide sensor 306. The chlorine dioxide sensor 306 determines the concentration of chlorine dioxide in the water in fluid conduit 304 and generates an electrical signal representative thereof. The output of the chlorine dioxide sensor 306 is provided over electrical connection 308.

Supply water is provided from the body of water 102, over fluid connection 362 to both the PLC chlorine dioxide generator 354 and to the pump 368 over connection 366. In accordance with this embodiment, a fluid coupling 358 is connected to the fluid conduit 104 such that a supply of water drawn from the treated body of water 102 is provided over connection 362, thus eliminating the water tank shown in previous embodiments.

In the embodiment shown in FIG. 3, the mobile chemical generation and application system 350 includes a programmable logic control (PLC) chlorine dioxide generator 354. The PLC chlorine dioxide generator 354 receives supply water over connection 362. However, in the embodiment shown in FIG. 3, the PLC chlorine dioxide generator 354 supplies chlorine-dioxide rich water directly to a venturi 374 over fluid connection 384.

The PLC chlorine dioxide generator 354 also includes an additional chlorine dioxide sensor 386, which monitors the concentration of chlorine-dioxide being supplied from the PLC chlorine dioxide generator 354 to the venturi 374. The chlorine dioxide sensor 386 determines the concentration of chlorine dioxide being supplied over fluid connection 384 and generates an electrical signal representative thereof on electrical connection 388. While shown as part of the PLC chlorine dioxide generator 354, the feedback system 378 and the chlorine dioxide sensor 386 can be separate elements. As known in the art, the venturi 374 provides approximately 95% mixing efficiency when combining the aqueous chlorine dioxide in connection 384 and mixing it with the aqueous flow in connection 372.

A chlorine dioxide sampling point 364 is inserted in the fluid conduit 126 downstream from the tap 124. The chlorine dioxide sampling point 364 can be a quick disconnect fitting similar to the sampling point 302, or can be any fluid conduit. The chlorine dioxide sampling point 364 directs a portion of the water in fluid conduit 126 and passes it through a fluid conduit 365 to the chlorine dioxide sensor 306. The chlorine dioxide sensor 306 includes a dual-probe arrangement so that it can determine the concentration of chlorine dioxide in the water in fluid conduit 365, as well as the concentration of chlorine dioxide in the water in fluid conduit 304 and generate electrical signals representative of each of the respective concentrations. The output of the chlorine dioxide sensor 306, representing the concentration of chlorine dioxide in fluid conduit 122 and in fluid conduit 126 is provided over electrical connection 308 to the feedback system 378.

The feedback system 378 can receive information regarding the concentration of chlorine dioxide at the chlorine dioxide sampling point 302, and at the chlorine dioxide sampling point 364, and can also receive information regarding the concentration of chlorine dioxide being provided to the venturi 374. The feedback system 378 can then control the amount of chlorine dioxide being generated by the PLC chlorine dioxide generator 354 based on a number of factors, such as desired concentration, ratio of the concentration of chlorine dioxide at the sampling point 302, the sampling point 364 and the output of the PLC chlorine dioxide generator 354, etc. In a typical scenario the PLC chlorine dioxide generator 354 would be programmed to deliver the maximum safe concentration of chlorine dioxide at the beginning of a treatment, and then taper off the chlorine dioxide delivery concentration to maintain the desired chlorine dioxide level for an allotted, or predetermined, time period. The system then would automatically purge all residual chlorine dioxide from the system and shutdown. In this manner, water rich in chlorine dioxide is provided to the swimming pool 102. In an embodiment, the desired concentration of chlorine dioxide at the pool can be 2.5 to 3.5 parts per million (ppm); however, other concentration levels are possible. Eliminating the water tank substantially reduces the weight and increases the portability of the mobile chemical generation and application system 350. Further, by using the chlorine dioxide sensor 306, the chlorine dioxide sensor 386, and feedback system 278, the target dose of chlorine dioxide can be easily reached and maintained. This is important to safeguard sanitation levels by accounting for chlorine dioxide degradation from biological demand and from photo degradation from ultraviolet sunlight radiation.

Figure 4:
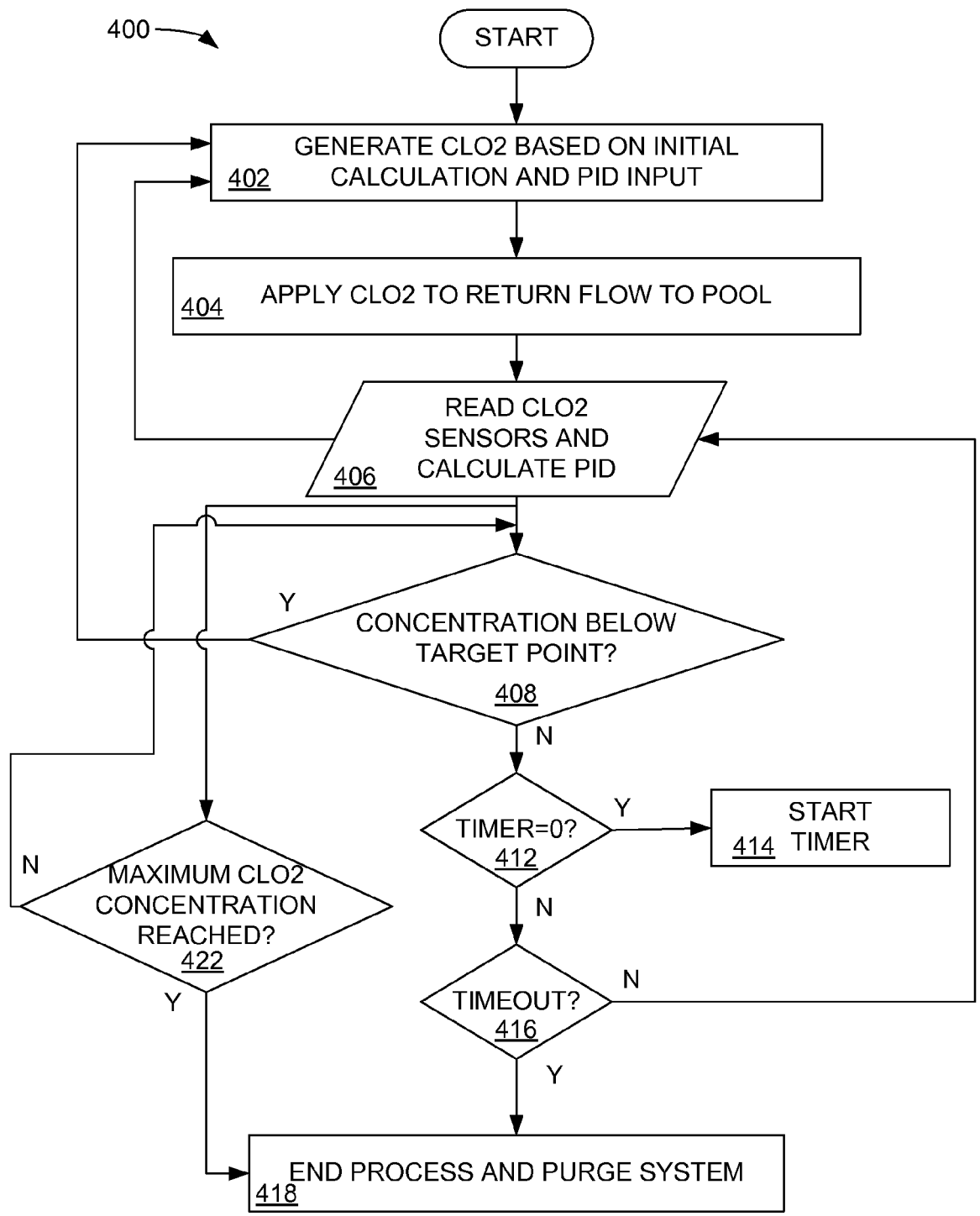
FIG. 4 illustrates a flow diagram for the embodiment of the mobile system for generating and dispensing a chemical shown in FIG. 2 and FIG. 3.

FIG. 4 illustrates a flow diagram for the embodiments of the mobile system for generating and dispensing a chemical shown in FIG. 2 and FIG. 3. The blocks in the flow chart of FIG. 4 can be performed in or out of the order shown. In addition, at least some of the blocks can be performed in parallel.

In block 402 chlorine dioxide is generated by the PLC chlorine dioxide generator 254, 354 based on an initial calculation of the desired and safe concentration level. In block 404 the chlorine dioxide is applied to the return flow (fluid conduit 126) of the body of water 102 via the tap 124 and the venturi 274 (FIG. 2) or the venture 374 (FIG. 3).

In block 406, data from the chlorine dioxide sensors 206 and 286 (FIG. 2) or 306 and 386 (FIG. 3) showing the concentration of chlorine dioxide at the respective sampling points is received by the feedback system 278, 378 and the respective PID calculations are performed to determine the concentration of chlorine dioxide in the body of water 102.

In block 408, it is determined whether the concentration of chlorine dioxide is below the target level. If it is determined in block 408 that the concentration of chlorine dioxide is below the target level, then the process returns to block 402. If however, it is determined in block 408 that the concentration of chlorine dioxide is at or above the target level, then, in block 412 it is optionally determined if the timer in the feedback system is equal to zero.

If the time is equal to zero, then in block 414, the timer is started. If it is determined in optional block 412 that the timer is not equal to zero, then, in block 416, it is determined whether the timer has expired. If the time has not expired, then the process returns to block 406. If the time has expired, then, in block 418, the process ends, the delivery of chlorine dioxide is terminated, and the system is purged of chlorine dioxide. The timer is implemented to fully automate the delivery of chlorine dioxide, and to terminate the operation of the system after a predetermined period of time after the desired concentration of chlorine dioxide is reached. In some embodiments, the timer may be omitted, and the delivery of chlorine dioxide manually terminated.

In block 422 it is determined if a maximum concentration of chlorine dioxide has been reached. If the concentration of chlorine dioxide exceeds a predetermined amount, the process ends and the system is purged. For example, the maximum allowable concentration of chlorine dioxide can be set by a user, with a maximum concentration of, for example, 3000 ppm.

While various embodiments of the invention have been described, it will be apparent to those of ordinary skill in the art that many more embodiments and implementations are possible that are within the scope of the invention.

What is claimed is:

1. A mobile system for generating and dispensing chlorine dioxide to a swimming pool, comprising:
   a portable platform, the portable platform comprising a source of locally-generated gaseous chlorine dioxide which forms a solution in water;
   wherein the source of locally-generated gaseous chlorine dioxide comprises a water tank and chlorine dioxide generator tablets that when dissolved in water of the water tank form chlorine dioxide;
   a fluid coupling through which the locally-generated gaseous chlorine dioxide is delivered to the swimming pool; and
   a vapor recovery system capturing gaseous chlorine dioxide residing above the water of the water tank and transferring the gaseous chlorine dioxide residing above the water of the water tank to an outflow of chlorine dioxide rich water from the water tank.

2. The system of claim 1, wherein the portable platform is chosen from a truck and a trailer.

3. The system of claim 1, comprising a first sensor configured to determine a concentration of chlorine dioxide, wherein the first sensor is configured to determine a concentration of chlorine dioxide at a point upstream of the fluid coupling with respect to a direction of the flow of water in a water flow loop where the fluid coupling is located.

4. The system of claim 3, further comprising a second sensor configured to determine a concentration of chlorine dioxide at a point downstream of the fluid coupling with respect to a direction of the flow of water in the water flow loop where the fluid coupling is located, the second sensor coupled to a feedback system.

5. The system of claim 4, wherein the feedback system determines the concentration of chlorine dioxide at the point upstream of the fluid coupling and automatically controls a concentration of chlorine dioxide in the swimming pool system based on a predetermined concentration.

6. The system of claim 1, wherein the vapor recovery system comprises a vapor capture apparatus connecting gaseous chlorine dioxide outflow from the water tank via a venturi to the outflow of chlorine dioxide rich water from the water tank.

7. A mobile system for generating and dispensing chlorine dioxide to a swimming pool comprising:
   a portable platform, the portable platform comprising a source of locally-generated gaseous chlorine dioxide, the source of locally-generated gaseous chlorine dioxide comprising a water tank and chlorine dioxide generator tablets that when dissolved in water from the water tank form gaseous chlorine dioxide;
   a fluid coupling coupled to a water flow loop through which the locally-generated chlorine dioxide is delivered to the swimming pool, the water flow loop including at least one conduit receiving a flow of water from the swimming pool and returning at least a portion of the flow of water to the swimming pool; and
   a vapor recovery system capturing gaseous chlorine dioxide residing above the water of the water tank and transferring the gaseous chlorine dioxide residing above the water of the water tank to an outflow of chlorine dioxide rich water from the water tank.

\* \* \* \* \*